United States Patent [19]

Woolf

[11] 4,433,802
[45] Feb. 28, 1984

[54] COMBINATION BACK PACK AND BICYCLE SADDLE PACK

[76] Inventor: Robert M. Woolf, 2722 Queen City Ave., Cincinnati, Ohio 45238

[21] Appl. No.: 448,388

[22] Filed: Dec. 9, 1982

[51] Int. Cl.³ .............................. B62B 1/20; B62J 9/00
[52] U.S. Cl. ................................ 224/153; 224/32 A; 224/40; 224/42.01; 224/213
[58] Field of Search ................. 224/151, 153, 155, 31, 224/32 R, 32 A, 33 R, 39, 40, 210, 42.01, 214, 213, 211, 212, 261, 262, 263

[56] References Cited

U.S. PATENT DOCUMENTS

| | | |
|---|---|---|
| 643,373 | 2/1900 | Gabriel et al. ......................... 224/31 |
| 3,786,972 | 1/1974 | Alley . |
| 3,874,574 | 4/1975 | Heise . |
| 3,937,374 | 2/1976 | Hine, Jr. . |
| 4,018,370 | 4/1977 | Wood ................................... 224/263 |
| 4,174,795 | 11/1979 | Jackson et al. . |
| 4,266,702 | 5/1981 | Jackson et al. . |
| 4,345,703 | 8/1982 | Allen ............................... 224/32 A |

FOREIGN PATENT DOCUMENTS

| | | | |
|---|---|---|---|
| 16975 | 3/1913 | France .................................. 224/40 |
| 429746 | 2/1948 | Italy ...................................... 224/31 |
| 19235 | of 1900 | United Kingdom .................. 224/40 |

Primary Examiner—Allan N. Shoap
Assistant Examiner—Robert Petrik
Attorney, Agent, or Firm—Wood, Herron & Evans

[57] ABSTRACT

A combination back pack and bicycle saddle pack is disclosed, wherein the frame of the back pack is mountable to the bicycle above the rear wheel to serve as a horizontal rack from which two pack bags hang suspended as panniers on opposite sides of the rear wheel. The front end of the pack frame is mounted to the bicycle by quick attachment means adjacent the bicycle seat; the rear end of the frame is supported by a swingably positionable strut which extends upwardly from the rear wheel axle.

10 Claims, 7 Drawing Figures

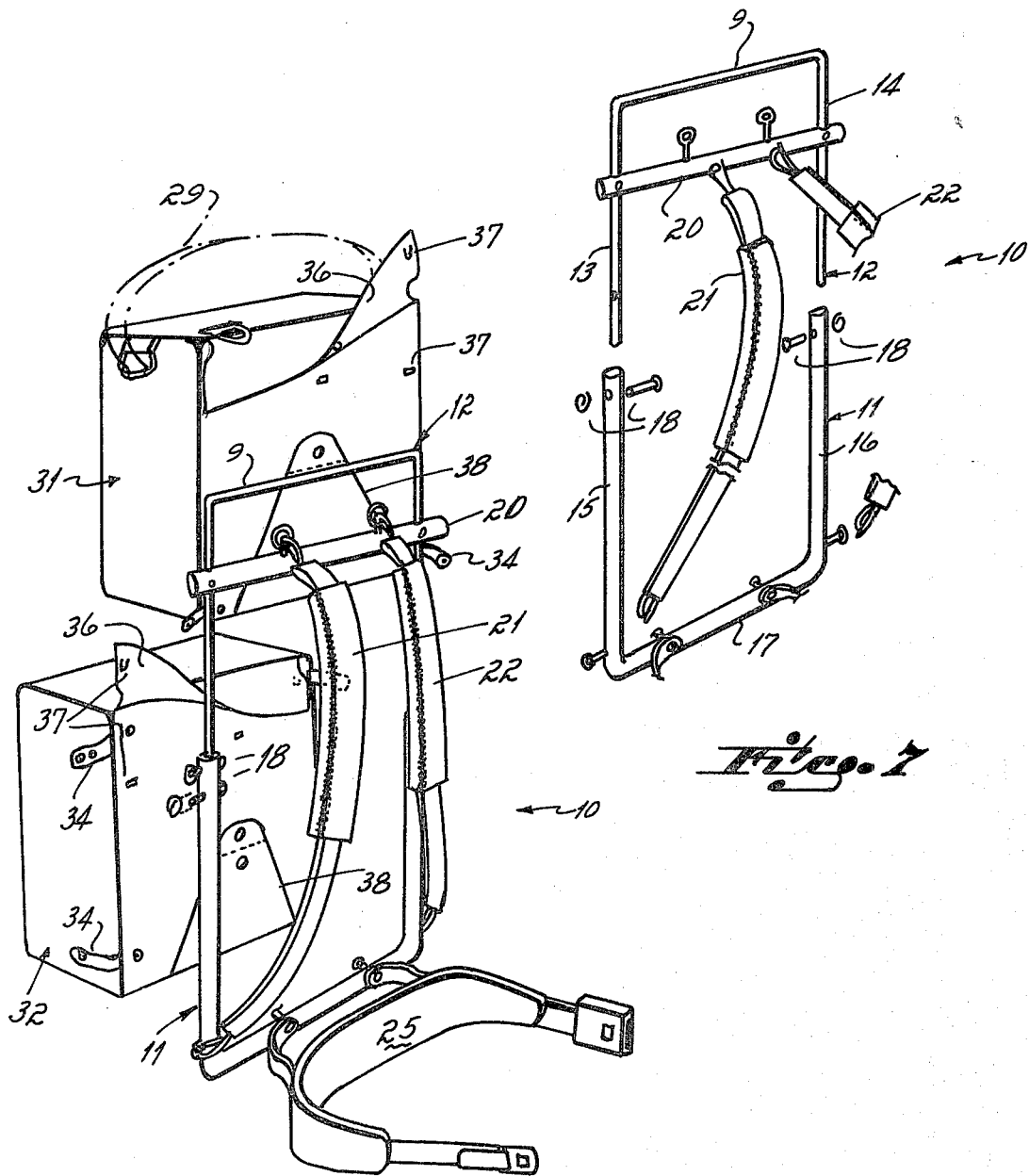

COMBINATION BACK PACK AND BICYCLE SADDLE PACK

FIELD OF THE INVENTION

This invention relates to a frame back pack which can be converted to use as a bicycle saddle pack.

PRIOR ART

It is known to provide packs that can alternately be carried as luggage, or carried on the back, or mounted to a bicycle as pannier bags.

In Alley U.S. Pat. No. 3,786,972, a back pack is shown which can be hooked onto a separate bicycle luggage carrier by the use of special spring tensioning means. Heise U.S. Pat. No. 3,874,574, and Hiene U.S. Pat. No. 3,937,374, illustrate other back pack bags which can be demounted from a pack frame and then attached to a separate carrier mounted to a bike, for use as saddle bags. Two U.S. Pats. to Jackson et al, Nos. 4,174, 795 and 4,266,702, both show pannier mounting arrangements having rods which slide into specialized horizontal channels on a separate bike carrier, for secure attachment.

BRIEF DESCRIPTION OF THE INVENTION

The bag of this invention differs from the prior art in that a frame is provided which comprises both the vertical frame of a back pack and the horizontal rear carrier for a bicycle. Two back pack bags are mountable to the frame, one above the one on the frame for use as a back pack, and one on each side of the frame to hang suspended beside a bicycle rear wheel as pannier bags. The frame can be adjusted for attachment to the bicycle to provide a horizontal rear carrier or rack, being supported by a special bracket adjacent the seat and by a support strut which extends upwardly from the rear axle. The pack frame can easily be removed from the connecting means on the bicycle in order to minimize weight when the carrier is not needed.

In accordance with this invention, a pack is provided having an adjustable, generally rectangular external frame which is preferably formed by two tubular U-shaped members that slidably or telescopingly interfit. The frame may have a cross bar for rigidifying it, and receives detachable straps for supporting it on the wearer's back. Two cloth pack bags, which may be similar to each other, are attachable to the frame, one above the other, for back pack use. These have openable flaps for loading, and may have side and/or flap pockets for extra storage.

The frame is also mountable to a bicycle above the rear wheel of the bicycle, by quick attachment means which are carried by the bicycle. With the frame adjusted to proper size and oriented in horizontal position above the rear wheel, the forward end of the frame is receivable in a bracket mounted to the bicycle below the seat thereon; the rear end of the frame is mountable to a support strut which extends upwardly from the rear axle mounts. This strut is swingable between an out-of-use forward position, in which the upper end of the strut is received in the bracket adjacent the seat, and a rearward in-use position in which the upper end of the strut is attached to the pack frame, to support the rear end of the frame so that the frame is fixed in a generally horizontal position on the bike with the long axis of the frame parallel to that of the bicycle.

Means are provided for attaching the pack bags to the respective sides of the pack frame when the frame is mounted on the bicycle, to suspend the bags from the frame on both sides of the rear wheel. The frame is of such width as to space the bags outwardly of the rear wheel sufficiently that they do not impede pedaling movement. Frame length is adjustable to fit the bike.

The frame can easily be removed from the bracket and the support strut, which remain on the bike.

The invention can best be further described and explained by reference to the accompanying drawings, wherein:

FIG. 6 is a perspective view showing the manner in which two pack bags are attached to the frame for back pack use; and FIG. 7 is an exploded perspective view showing the details of the connection of the crossbar, back straps, and hip belt to the pack frame.

DETAILED DESCRIPTION OF THE INVENTION

Figure 1:
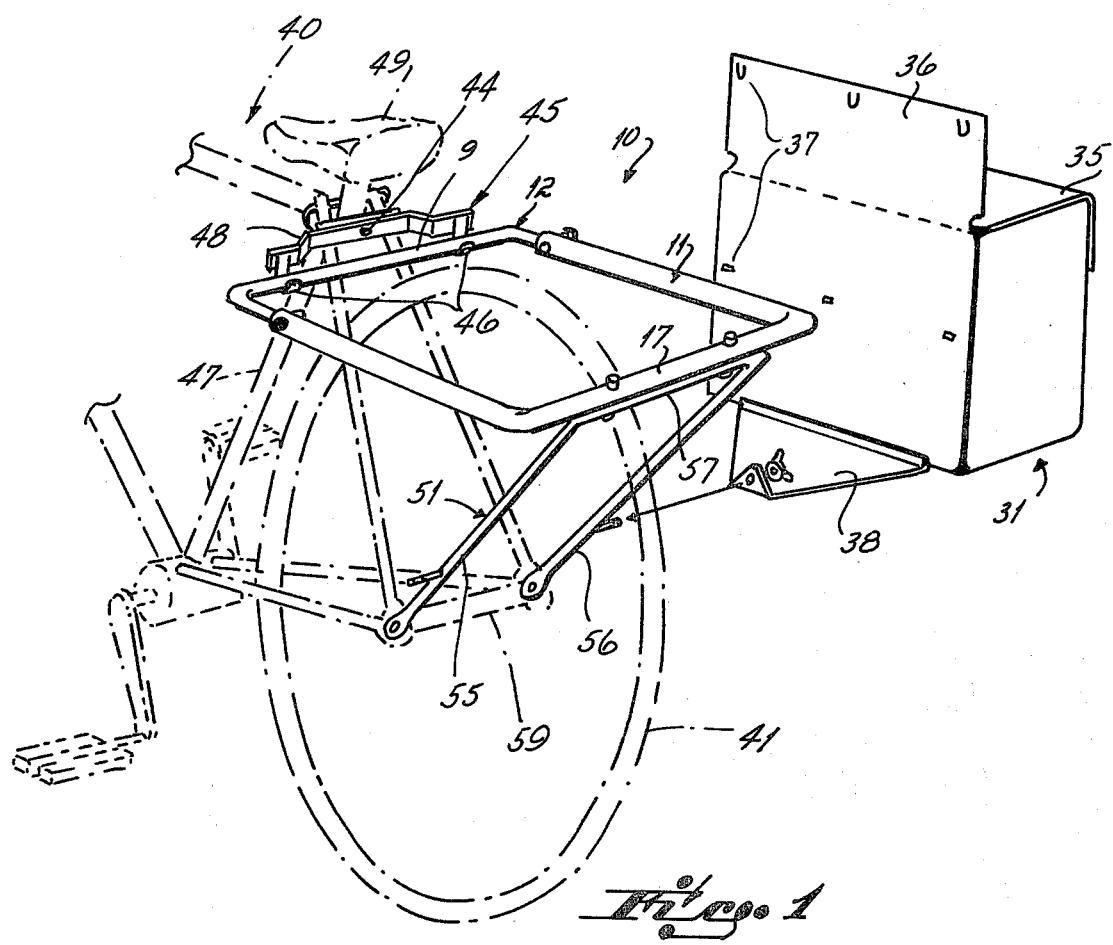
FIG. 1 is a fragmentary exploded perspective view, showing a pack frame and a single pack bag in accordance with the preferred embodiment of the invention, as being mounted to a bicycle for carrying the bag as a single pannier.

The invention is first described herein its presently preferred back pack configuration which is shown in FIGS. 6 and 7. The back pack includes a rigid external frame, designated generally by 10, which comprises two interfitting, generally U-shaped sections 11 and 12. Each U-shaped section may be of metal tube, the upper section 12 being dimensioned so that its legs (sides) 13, 14, will telescope into the respective legs 15 and 16 of the lower frame section 11. Thus the "height" of the pack frame, i.e., the dimension between the top 9 and the bottom 17 in FIG. 7, can be varied to accommodate the user's height. The two sections are secured together in adjusted position by clevis pins and spring clip fasteners as designated at 18 in FIG. 7, or by other means which may be conventional.

Frame 10 has a removable crossbar 20, which is connected across the legs 13, 14 of upper frame section 12 by clevis pins. Padded carrying straps 21, 22 are connectable between crossbar 20 and the bottom frame section 11. A padded hip belt 25, which may be of a type known in the art, is a desirable option.

Figure 2:
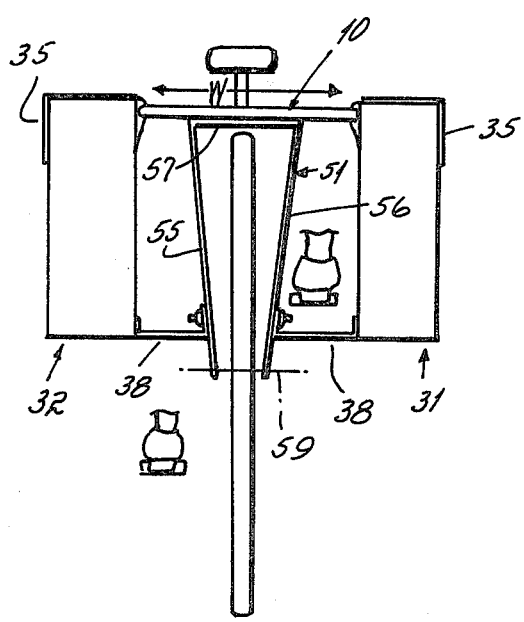
FIG. 2 is a rear elevation, partly diagrammatic, of a bicycle having two bags mounted to it and illustrates the lateral clearance between the bags and the rear wheel.
Figure 3:
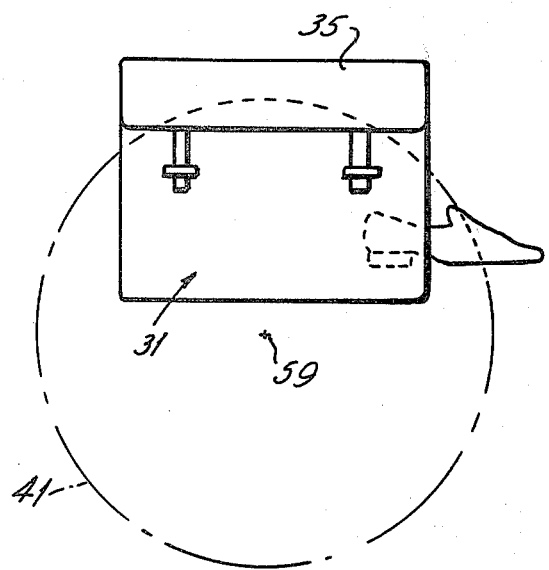
FIG. 3 is a side view somewhat diagrammatic in nature, of the rear wheel of the bicycle shown in FIG. 2.
Figure 4:
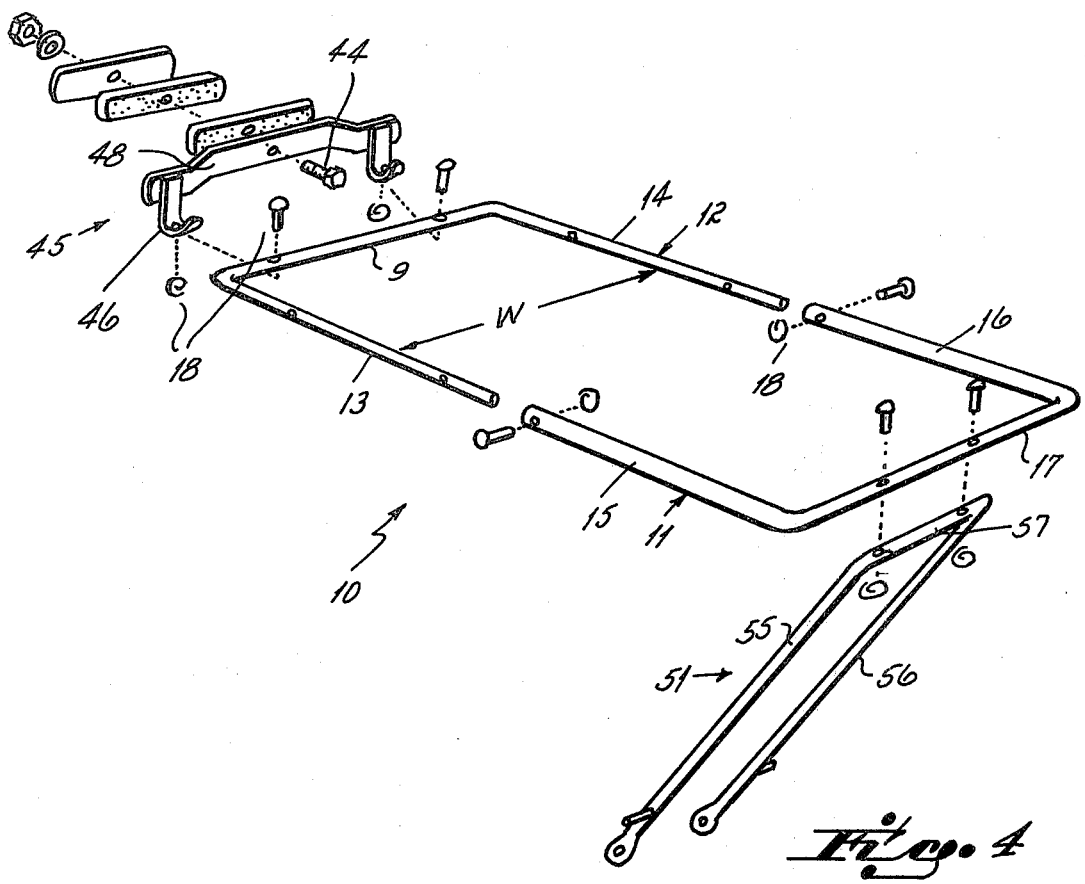
FIG. 4 is an exploded perspective view of the frame and frame support members as oriented for mounting to the bicycle.

Frame 10 can carry either one or two cloth bags as designated at 31, 32, in FIG. 6. These bags 31 and 32 are mounted one above the other on the frame, and may be generally rectangular in shape, each having a securable top and/or front panel 35 (see FIGS. 2 and 3), and optional side pockets. Each bag has a downwardly foldable flap 36 on its back at the top (see FIG. 6) which is securable to the back as by hooks and eyes 37. The flap 36 of the top bag 31 is used to attach the bag to the frame top 9 (FIG. 6) for pack use; the flaps of both bags are used to support the bags from the sides of the frame in the pannier configuration (FIG. 2). Each bag also has vertical fastener means such as hook and pile fasteners or snaps, as designated at 34, to attach the bag to the frame for pack use.

Each bag 31 and 32 has a stiff triangularly shaped spacer tab 38 (see FIGS. 1, 2, and 6) hingedly attached along the lower edge of its back panel. When the bag is mounted to the pack frame, this spacer tab folds upwardly against and is secured to the back of the bag (see FIG. 6). The tabs 38, 38 serve to space the bags outwardly of the bicycle rear wheel when the bags are used as panniers, as will be described. Each bag may have a carrying strap 29, by which it can be carried as hand luggage when demounted from the frame, and may have D-rings to which the straps 21, 22 can be connected to carry a single bag, without the frame. Stiffener panels or braces, not shown, may be inserted in the bags to hold them in extended shape, if desired for ease of loading.

The use of the pack frame and bags for mounting as a saddle pack on a bicycle is shown in FIGS. 1–5. For such use the two bags 31 and 32 are demounted from the frame and the frame is attached in a generally horizontal orientation over the bicycle rear wheel 41. A bicycle, which may otherwise be conventional, is shown in phantom and is designated by 40, and its rear wheel by 41. To receive pack frame 10, the bicycle is provided with a forward or seat bracket 45 which is fixed to the bicycle below the seat 49 thereof. The elements of bracket 45 are shown in exploded relation in FIG. 4. The bracket provides a pair of laterally spaced, upwardly opening seats or hooks 46, 46 into which the pack frame end portion 9 can be secured as by clevis pins (see FIG. 4) when the frame and bags are to be used as a saddle pack. These hooks 46, 46 depend from a crossbar 48 which can be clamped or otherwise fastened to the seat tube 47 of the bicycle by a through bolt 44. The bracket 45 normally remains on the bicycle, that is, it is not removed from the bicycle with the frame. Bracket 45 receives the upper end 9 of the frame, which in this horizontal position becomes the front end.

For mounting to the bicycle, pack frame 10 usually will be adjusted to a smaller length dimension between its ends 9 and 17. This is done by telescoping the frame legs 13 and 14 into legs 15 and 16, to such length as is appropriate. The lateral spacing (width) between these legs is designated by W in FIGS. 2 and 4 and should be sufficient not only to accommodate the width of the pack bags but also sufficient to space the bags away from the rear wheel 41 to provide clearance for pedal movement, see FIG. 2.

Figure 5:
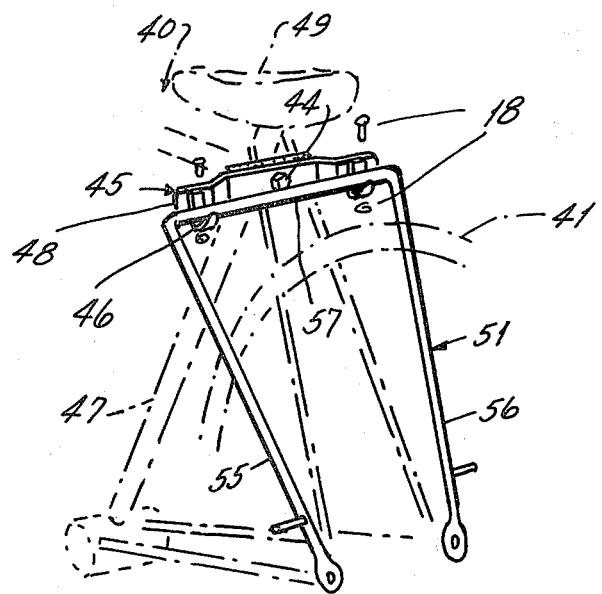
FIG. 5 is a fragmentary perspective showing the manner in which the support strut is received in the support bracket when the frame has been removed.

With the front end 9 of frame 10 supported by the bracket 45, the rear end 17 of the frame (as seen in horizontal position) is supported by a swingable strut 51. This is an inverted U-shaped element having legs 55, 56 and a top portion 57. The lower end of each leg 55, 56 is attached as by bolts to the ends of the rear wheel axle 59. The top portion 57 of strut 51 is cross drilled to be connected, as by clevis pins, to the frame end 17 (see FIG. 4). Strut 5 is swingable about axle 59 between a rearward "use" position illustrated in FIGS. 1 and 4, and between a forward or not-in-use position, illustrated in FIG. 5. In the not-in-use position the rear strut 51 is brought forward so that upper position 57 thereof is received and secured in the hooks 46, 46 of support bracket 45. As does bracket 45, strut 51 normally remains on the bicycle, the bracket securing the strut as shown in FIG. 5 in the not-in-use position.

As has been described, when used as a back pack the two pack bags 31, 32 hang from the frame, parallel to it. When used as pannier bags on a bicycle, the bags hang at right angles to the frame, from frame legs 13–16, being suspended from the legs by the flaps 36, 36. To prevent the bags from swinging inward about the frame, toward the rear wheel, the spacer tabs 38, 38 at the bottom of the bags are connected to studs which project outwardly from strut 51, the spacer tabs being sized to maintain the bags in essentially vertical attitude. These tabs provide clearance between the rear wheel and the back side of the bags, so that the bags do not extend into the orbit of the pedal motion (see FIGS. 2 and 3). If the bags were mounted more closely to the bicycle, it would be necessary to shape the bags with diagonally cut off corners, to avoid interference with pedaling.

Normally the two bags will be used together, as pannier bags, for better balance; if only one bag is to be carried, it is usually preferable to center it above the frame, using the cross bar 20 for support, to avoid off-center loading of the bike.

Having described the invention, what is claimed is:

1. A pack which can be used alternately as a backpack and as a saddle pack for a bicycle, comprising,
   a generally rectangular frame,
   a pair of pack bags and attachment means for mounting the bags to the frame one above the other thereon for backpack use,
   a pair of back straps connectable to the frame for supporting it on a wearer's back,
   means for detachably mounting said frame horizontally above the rear wheel of a bicycle, the mounting means comprising,
      a bracket mountable to the bicycle adjacent the seat thereon to receive and support one end of the frame and
      a support strut mountable at a lower end thereof adjacent the rear axle of the bicycle, the strut when so mounted being swingable about the axle between an out-of-use forward position in which an upper end of the strut is received by said bracket, and an in-use rearward position in which said upper end of the strut is positioned to be connected to the frame to support the frame horizontally over the rear wheel,
   means for connecting the strut to the frame, and
   means for attaching each bag to the frame when the latter is mounted to the bicycle, so that the bags hang suspended from the frame on each side of the rear wheel.

2. The pack of claim 1 wherein said bracket comprises hooks, into which said one end of said frame can be snapped.

3. The pack of claim 1 wherein said bracket is mountable to the seat tube of the bicycle, just below the seat thereon.

4. The pack of claim 1 wherein said strut is in the shape of an inverted U, having two legs which are pivotally connected to opposite ends of the rear axle of the bicycle.

5. The pack of claim 1 wherein said strut is releasably connectable to an end of said frame opposite from said one end.

6. The pack of claim 1 wherein the frame is formed by two U-shaped members having legs which are adjustably interconnected.

7. The pack of claim 6 wherein said legs of said frame are telescopingly interfitted.

8. The pack of claim 1 also including a cross bar attachable to said frame, said straps being connectable to said crossbar.

9. The pack of claim 1 wherein the bags further include spacer tab means connectable between the bags and the bicycle adjacent the rear axle thereof to hold the bags sufficiently outwardly of the rear wheel that they do not interfere with pedaling motion.

10. A pack which can be used alternately as a backpack and as a saddle pack for a bicycle, comprising,
- a generally rectangular frame,
- a pair of pack bags,
- a pair of back straps connectable to the frame for supporting it on a wearer's back,
- attachment means for mounting the bags to the frame one above the other thereon for backpack use,
- means for attaching each bag to a respective side of the frame when the latter is in horizontal position, so that the bags hang suspended from the frame at right angles thereto, and
- means for detachably mounting said frame horizontally above the rear wheel of a bicycle, the mounting means comprising,
  - a bracket mountable to the seat tube of bicycle below the seat to receive and support a forward end of the frame,
  - a support strut pivotally mountable to the rear axle of the bicycle, the strut when so mounted being swingable about the axle between an out-of-use forward position in which an upper portion of the strut is reveived by the bracket, and an in-use rearward position in which said upper portion of the strut is positioned adjacent the rear end of the frame,
  - means for connecting the upper portion of the strut to the rear end of the frame, and
  - means for connecting the strut to the frame.

* * * * *